United States Patent
Umino et al.

(10) Patent No.: US 9,981,606 B2
(45) Date of Patent: May 29, 2018

(54) VEHICLE VISUAL RECOGNITION DEVICE

(71) Applicant: KABUSHIKI KAISHA TOKAI-RIKA-DENKI-SEISAKUSHO, Aichi-ken (JP)

(72) Inventors: Kazuya Umino, Aichi-ken (JP); Shigeki Yoshida, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 191 days.

(21) Appl. No.: 14/955,589

(22) Filed: Dec. 1, 2015

(65) Prior Publication Data

US 2016/0159284 A1    Jun. 9, 2016

(30) Foreign Application Priority Data

Dec. 5, 2014 (JP) ................. 2014-247061

(51) Int. Cl.
*G02B 7/182* (2006.01)
*B60R 1/074* (2006.01)
*B60R 1/00* (2006.01)

(52) U.S. Cl.
CPC .............. *B60R 1/006* (2013.01); *B60R 1/074* (2013.01); *G02B 7/182* (2013.01); *B60R 2300/802* (2013.01)

(58) Field of Classification Search
None
See application file for complete search history.

(56) References Cited

U.S. PATENT DOCUMENTS 5,639,054 A * 6/1997 Gerndt .................... B60R 1/076
248/289.11
7,168,816 B2 * 1/2007 Yoshida .................. B60R 1/074
359/841

(Continued)

FOREIGN PATENT DOCUMENTS

CN          1641236 A     7/2005
EP        2 990 267 A1    3/2016

(Continued)

OTHER PUBLICATIONS

Chinese Patent Application No. 201510801921.2 Office Action, dated Jun. 1, 2017 and English translation thereof.

(Continued)

*Primary Examiner* — Derek S Chapel
(74) *Attorney, Agent, or Firm* — Roberts Mlotkowski Safran Cole & Calderon P.C.

(57) ABSTRACT

In a vehicle door mirror device, a through hole of a case is penetrated by a support shaft so as to rotatably support the case on the support shaft. Lower ribs are formed in a protruding state at a peripheral face of the through hole, and protrusion leading end faces of the lower ribs are capable of contacting the support shaft. A gap dimension between the peripheral face of the through hole and the support shaft can accordingly be made small, thereby enabling rattling of the case with respect to the support shaft to be suppressed. Moreover, the contact surface area between the peripheral face of the through hole and the support shaft can be made small, thereby enabling an increase in sliding resistance between the peripheral face of the through hole and the support shaft to be suppressed.

7 Claims, 7 Drawing Sheets

(56) References Cited

U.S. PATENT DOCUMENTS

| | | | |
|---|---|---|---|
| 7,857,278 B2* | 12/2010 | Yoshida | B60R 1/074 248/479 |
| 9,022,587 B2* | 5/2015 | Toyama | B60R 1/06 359/872 |
| 2005/0152053 A1 | 7/2005 | Onuki | |
| 2009/0086351 A1* | 4/2009 | Sakata | B60R 1/076 359/872 |
| 2011/0228412 A1* | 9/2011 | Sakata | B60R 1/076 359/841 |
| 2011/0228413 A1* | 9/2011 | Sakata | B60R 1/074 359/841 |
| 2012/0145871 A1 | 6/2012 | Kawanishi | |

FOREIGN PATENT DOCUMENTS

| | | |
|---|---|---|
| JP | H05240971 A | 9/1993 |
| JP | H07083225 A | 3/1995 |
| JP | H10193223 A | 7/1998 |
| JP | 2001-151020 | 5/2001 |
| JP | 2002-293190 A | 10/2002 |
| JP | 2003335176 A | 11/2003 |
| JP | 2005-199820 A | 7/2005 |
| JP | 2012-126222 A | 7/2012 |
| JP | 2014004960 A | 1/2014 |

OTHER PUBLICATIONS

Office Action dated Oct. 25, 2016 issued in a corresponding Japanese Application No. 2014247061.

Japanese Office Action, dated May 9, 2017, and English translation thereof.

Office Action issued in the corresponding Japanese Patent Application No. 2014-247061 on Jan. 9, 2018.

* cited by examiner

VEHICLE VISUAL RECOGNITION DEVICE

CROSS-REFERENCE TO RELATED APPLICATION

This application claims priority under 35 USC 119 from Japanese Patent Application, No. 2014-247061 filed Dec. 5, 2014, the disclosure of which is incorporated by reference herein.

BACKGROUND

Field of the Invention

The present invention relates to a vehicle visual recognition device that assists a vehicle occupant with visual recognition.

Related Art

In an electric retractable mirror described in Japanese Patent Application Laid-Open (JP-A) No. 2001-151020, a support shaft is supported on a vehicle body side, and the support shaft penetrates a through hole of a drive case so as to rotatably support the drive case on the support shaft.

Note that in such electric retractable mirror, it is preferable to be able to suppress rattling of the drive case with respect to the support shaft, and to be able to suppress an increase in sliding resistance between the drive case and the support shaft.

SUMMARY

In consideration of the above circumstances, a vehicle visual recognition device capable of suppressing rattling of a rotating member with respect to a support shaft, and also capable of suppressing an increase in sliding resistance between the rotating member and the support shaft, is obtained.

A vehicle visual recognition device of a first aspect of the present invention includes: a support shaft that is supported at a vehicle body side; a rotation member that is provided with a through hole, and that is rotatably supported at the support shaft with the support shaft penetrating through the through hole; a protrusion portion that is protrudingly provided at a peripheral face of the through hole, and that is capable of contacting the support shaft; and a visual recognition section that is provided so as to be capable of rotating integrally with the rotation member, that assists a vehicle occupant with visual recognition, and that is stored or stands out by rotating of the rotation member.

A vehicle visual recognition device of a second aspect of the present invention is the vehicle visual recognition device of the first aspect, further including: a restriction portion that is provided at the vehicle body side, a position of the restriction portion coinciding with a position of the protrusion portion in an axial direction of the support shaft; and a rotation portion that is provided at the rotation member, a position of the rotation portion coinciding with the position of the protrusion portion in the axial direction of the support shaft, and rotating of the rotation member being restricted by the rotation portion abutting the restriction portion.

In the first aspect, it is possible that the vehicle visual recognition device further includes: a restriction portion that is provided at the vehicle body side; and a rotation portion that is provided at the rotation member, rotating of the rotation member being restricted by the rotation portion abutting the restriction portion, wherein a position of a leading end face of the protrusion portion, that is capable of contacting the support shaft, coincides with a position of at least a part of an abutting area where the restriction portion abuts the rotation portion, in an axial direction of the support shaft.

Further in the first aspect, it is possible that a plurality of protrusion portions, protruding toward a side of the support shaft, are provided at the peripheral face of the through hole along a peripheral direction of the support shaft, and respective leading end faces of the protrusion portions are capable of contacting the support shaft.

In the second aspect, it is possible that a position of a leading end face of the protrusion portion, that is capable of contacting the support shaft, coincides with a position of at least a part of an abutting area where the restriction portion abuts the rotation portion, in the axial direction of the support shaft.

Further in the second aspect, it is possible that a plurality of protrusion portions, protruding toward a side of the support shaft, are provided at the peripheral face of the through hole along a peripheral direction of the support shaft, and respective leading end faces of the protrusion portions are capable of contacting the support shaft; and the restriction portion and the rotation portion are provided at positions further toward an outer side than positions of the plurality of protrusion portions in a radial direction of the support shaft, and rotating of the rotation member is restricted by an end portion in the peripheral direction of the restriction portion abutting an end portion in the peripheral direction of the rotation portion.

In the vehicle visual recognition device of the first aspect, the support shaft is supported on the vehicle body side, and the rotation member is rotatably supported on the support shaft with the support shaft penetrating through the through hole of the rotation member. Moreover, the visual recognition section is provided so as to be capable of rotating integrally with the rotation member, and the visual recognition section assists the vehicle occupant with visual recognition, and is stored or stands out by rotating of the rotation member.

The protrusion portion is provided protruding out from the peripheral face of the through hole of the rotation member, and the protrusion portion is capable of contacting the support shaft. A gap dimension between the peripheral face of the through hole and the support shaft can accordingly be made small, thereby enabling rattling of the rotation member with respect to the support shaft to be suppressed. Moreover, the contact surface area between the peripheral face of the through hole and the support shaft can be made small, thereby enabling an increase in sliding resistance between the rotation member and the support shaft to be suppressed.

In the vehicle visual recognition device of the second aspect, the restriction portion is provided at the vehicle body side, and the rotation portion is provided at the rotation member. The rotation portion abuts the restriction portion so as to restrict rotating of the rotation member.

Note that the positions of the restriction portion, the rotation portion, and the protrusion portion coincide with each other in the axial direction of the support shaft. The rotation portion can accordingly abut the restriction portion appropriately, enabling rotating of the rotation member to be appropriately restricted.

BRIEF DESCRIPTION OF THE DRAWINGS

Embodiments will be described in detail with reference to the following figures, wherein.

DETAILED DESCRIPTION

Figure 1:
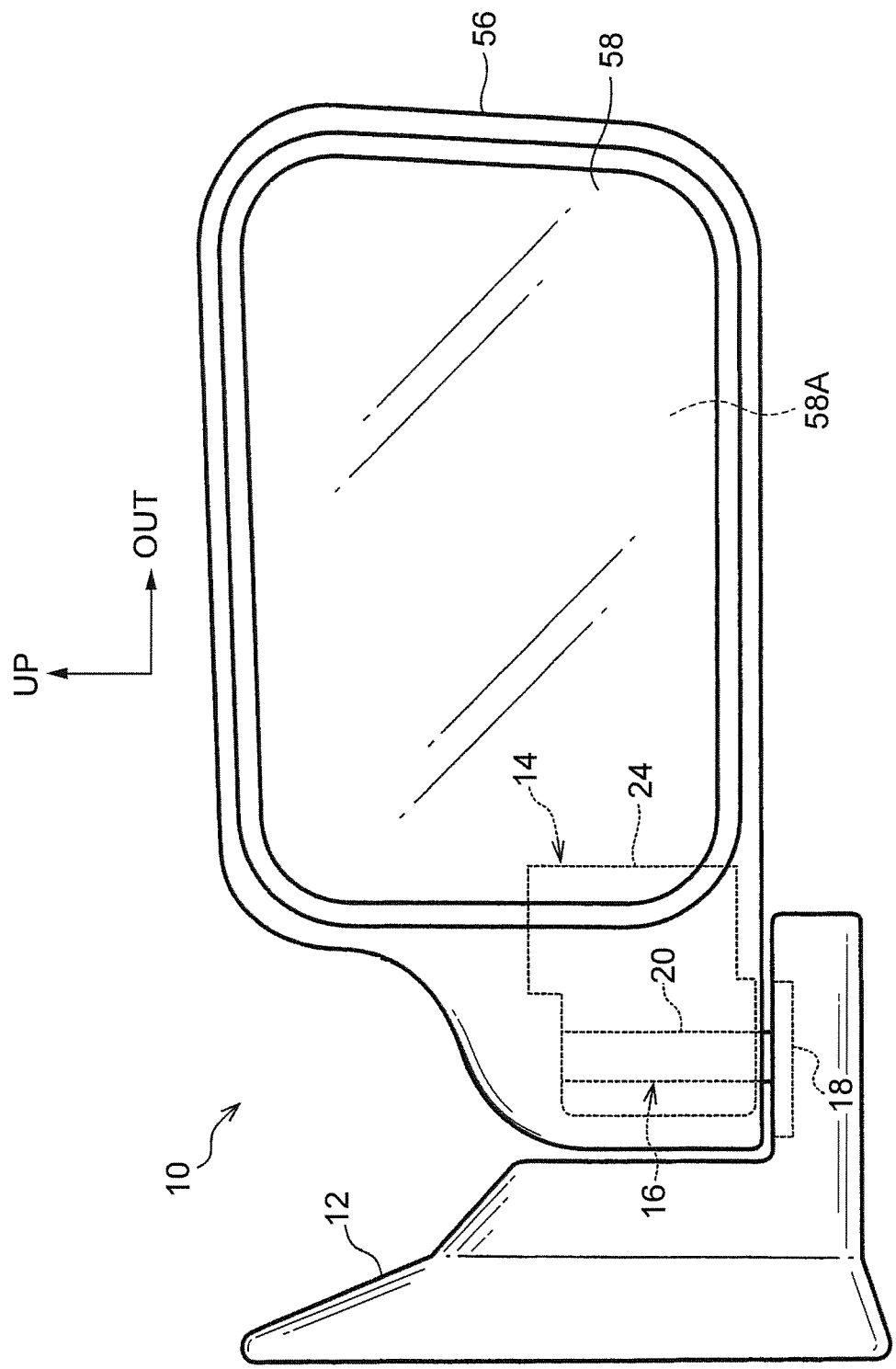
FIG. 1 is a face-on view illustrating a vehicle door mirror device according to an exemplary embodiment, as viewed from the vehicle rear.

FIG. 1 is a face-on view illustrating a vehicle door mirror device 10 (vehicle mirror device) serving as a vehicle visual recognition device according to an exemplary embodiment, as viewed from the vehicle rear. In the drawings, the arrow FR indicates the vehicle front, the arrow OUT indicates outward (the right of the vehicle) in the vehicle width direction, and the arrow UP indicates upward.

The vehicle door mirror device 10 according to the present exemplary embodiment is installed at an up-down direction intermediate portion and a vehicle front side end of a side door (specifically a front side door) serving as a door, this being a vehicle body side of the vehicle. The vehicle door mirror device 10 is disposed on the outside of the vehicle.

As illustrated in FIG. 1, the vehicle door mirror device 10 includes a stay 12 serving as an installation member configuring a support body. A vehicle width direction inside end of the stay 12 is fixed to the side door, thereby installing the vehicle door mirror device 10 to the side door.

A storing mechanism 14 (retractor) is supported at an upper side of a vehicle width direction outside portion of the stay 12.

Figure 2:
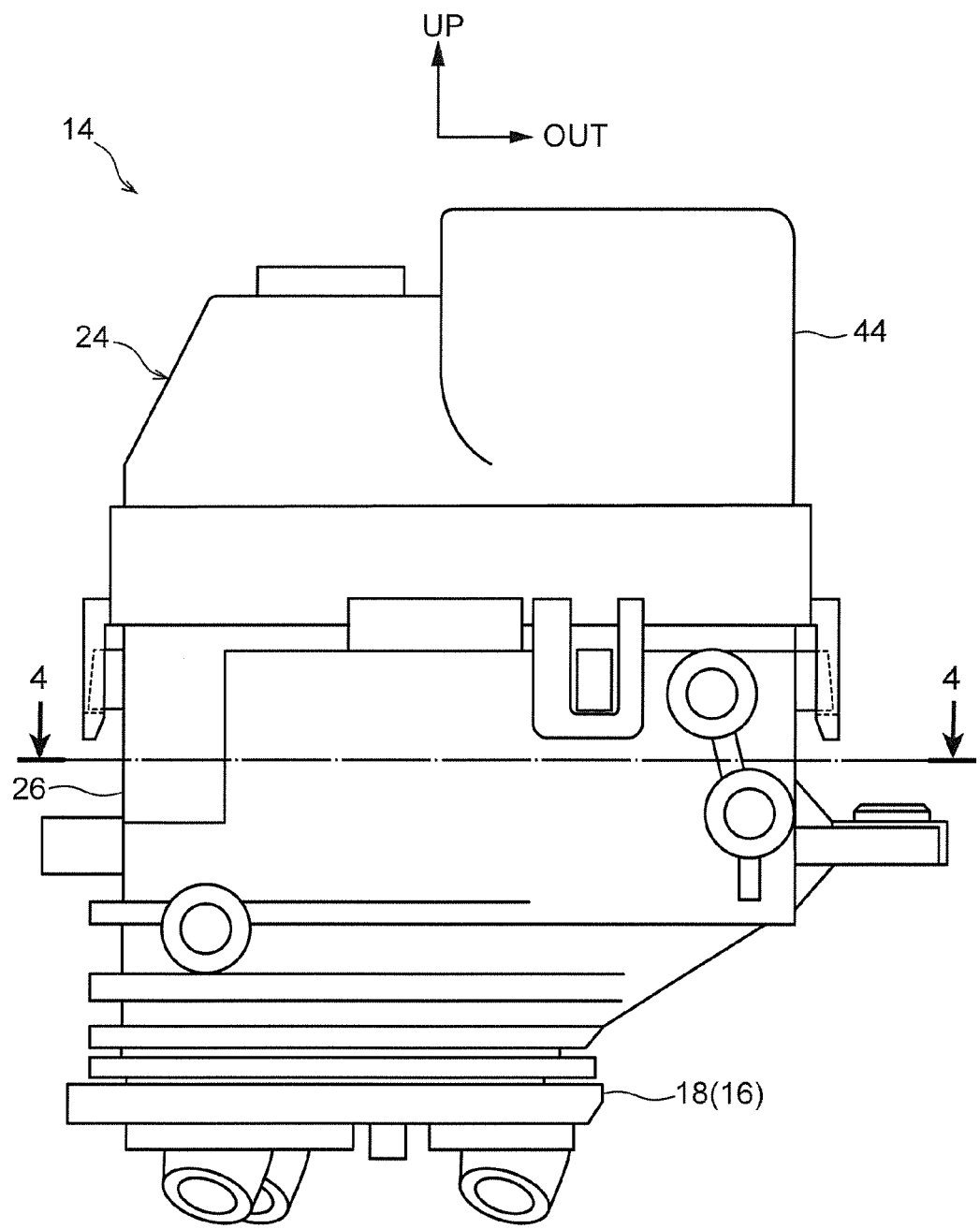
FIG. 2 is a face-on view illustrating a storing mechanism of a vehicle door mirror device according to an exemplary embodiment, as viewed from the vehicle rear.
Figure 3:
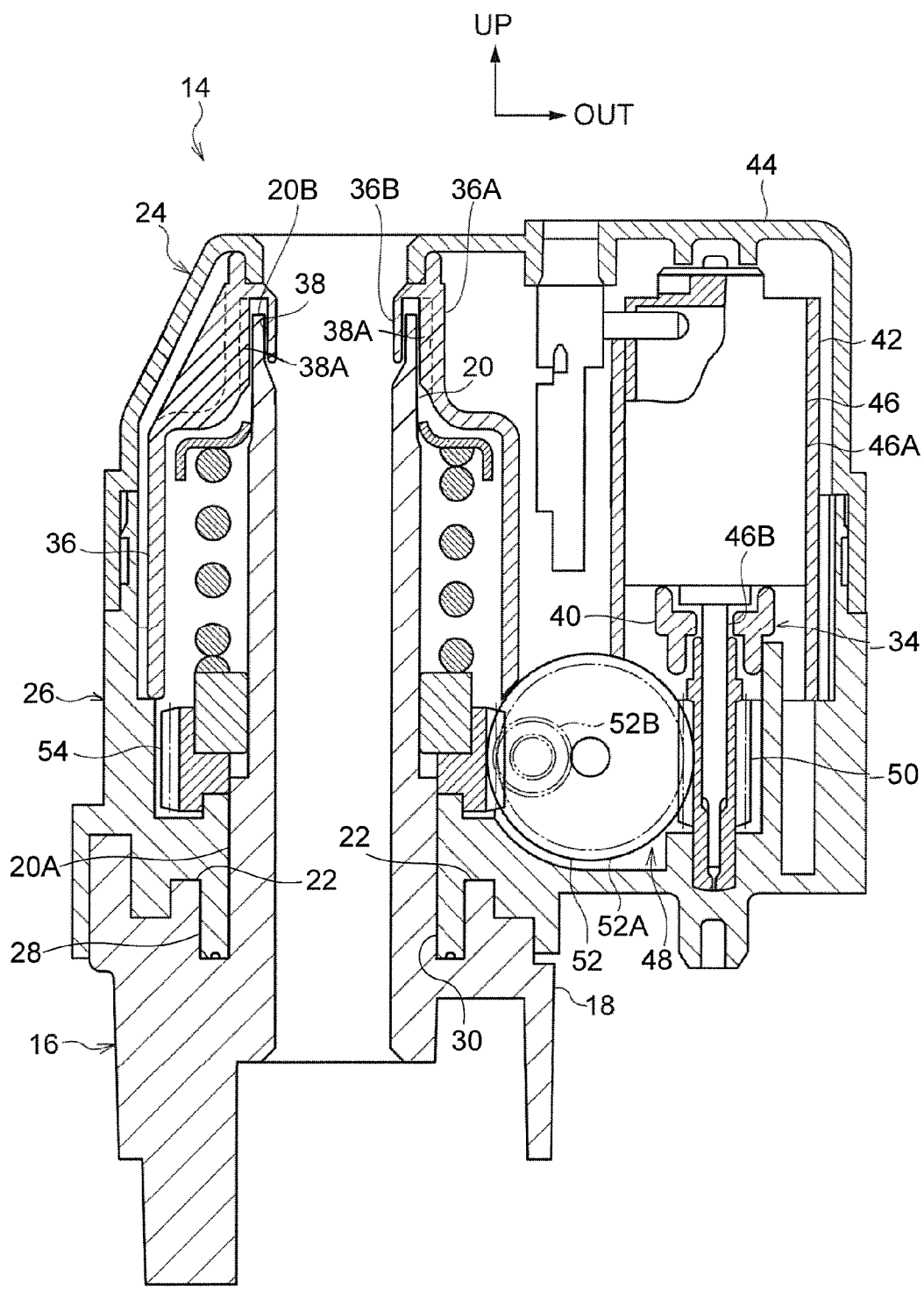
FIG. 3 is a cross-section illustrating a storing mechanism of a vehicle door mirror device according to an exemplary embodiment, as viewed from the vehicle rear.
Figure 4:
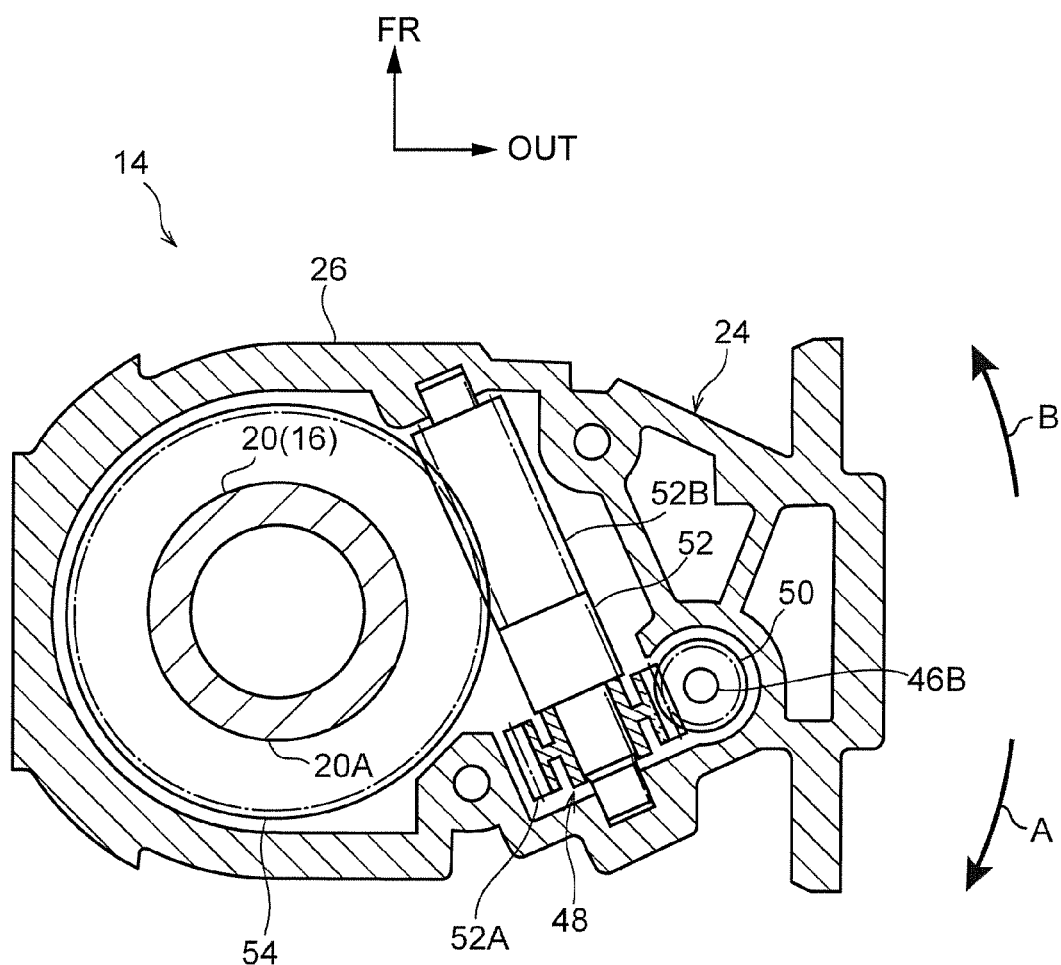
FIG. 4 is a cross-section (a cross-section taken along line 4-4 in FIG. 2) illustrating a storing mechanism of a vehicle door mirror device according to an exemplary embodiment, as viewed from above.

As illustrated in FIG. 2 to FIG. 4, the storing mechanism 14 is provided with a metal stand 16 serving as a support member configuring the support body. A substantially circular plate shaped fixing portion 18 is provided at a lower end of the stand 16, and the stand 16 is fixed to the stay 12 by fixing the fixing portion 18 to the stay 12, thereby supporting the storing mechanism 14 on the stay 12.

A substantially circular cylinder shaped support shaft 20 is integrally provided at an upper side of the fixing portion 18. The support shaft 20 stands up from the fixing portion 18, with its axial direction parallel to the up-down direction. A lower end portion of the support shaft 20 is configured by a circular cylinder shaped lower support cylinder 20A serving as a support portion, and the lower support cylinder 20A is disposed coaxially to the support shaft 20. An upper end portion of the support shaft 20 is configured by a circular cylinder shaped upper support cylinder 20B serving as an additional support portion, and the upper support cylinder 20B is disposed coaxially to the support shaft 20.

A specific number (two in the present exemplary embodiment) of substantially rectangular column shaped restriction projections 22, serving as restriction portion configuring a moderation section are integrally provided at an upper face of the fixing portion 18 at the peripheral outside of the support shaft 20. The specific number of restriction projections 22 curve along their length direction along the peripheral direction of the support shaft 20, and are disposed at uniform intervals around the peripheral direction of the support shaft 20. Both length direction end faces of each restriction projection 22 are inclined in directions heading toward the lower side on progression toward the length direction outside of the respective restriction projection 22.

The support shaft 20 of the stand 16 supports a drive body 24 configuring a rotation body, and the drive body 24 is capable of rotating about the support shaft 20 toward a store direction (the arrow A direction in FIG. 4) and a standing out direction (the arrow B direction in FIG. 4).

A lower side portion of the drive body 24 is provided with a container-shaped resin case 26 serving as a rotation member. An upper face of the case 26 is open.

Figure 5:
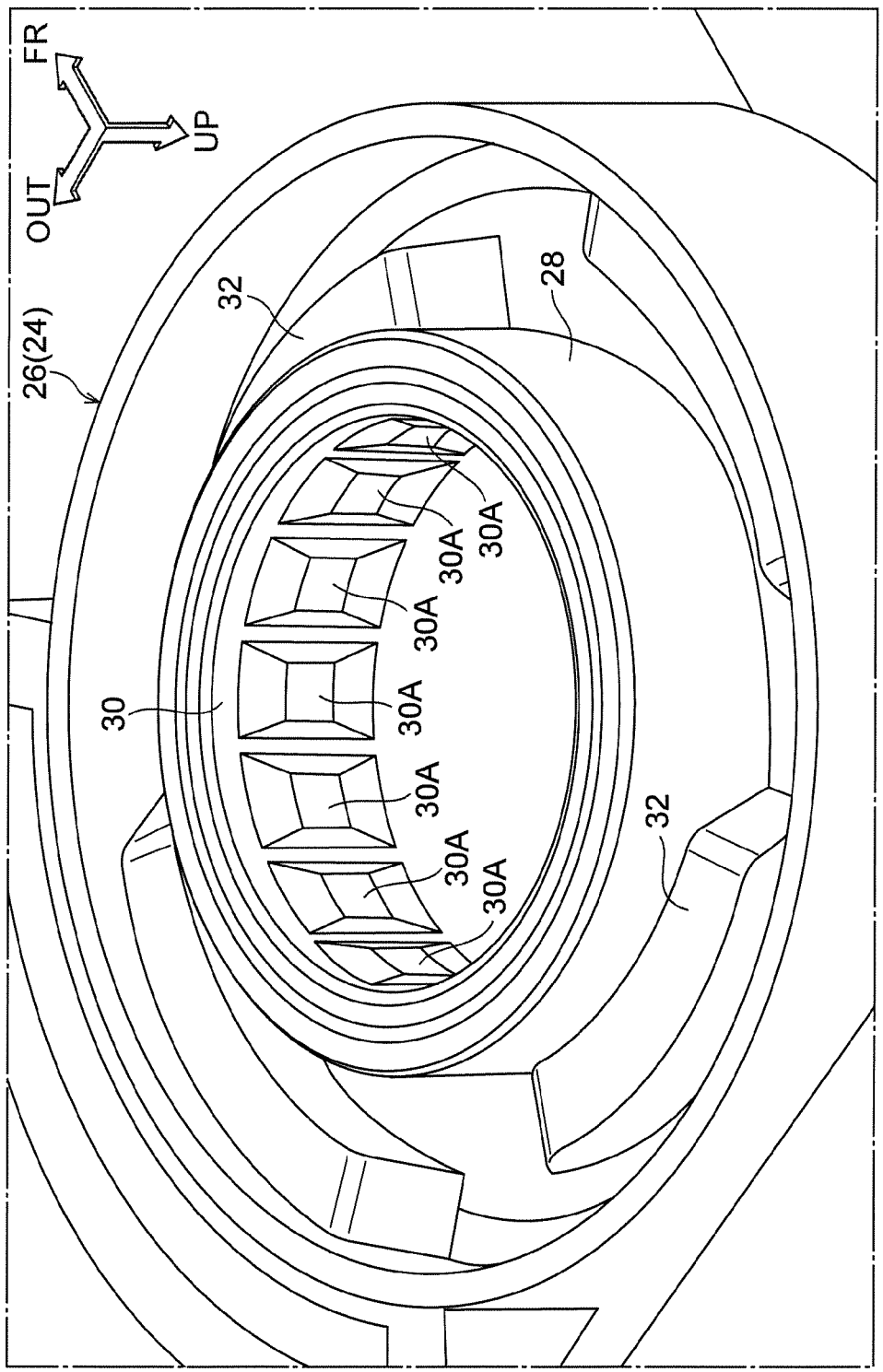
FIG. 5 is a perspective view illustrating a case of a storing mechanism of a vehicle door mirror device according to an exemplary embodiment, as viewed diagonally from below and from the vehicle rear.
Figure 6:
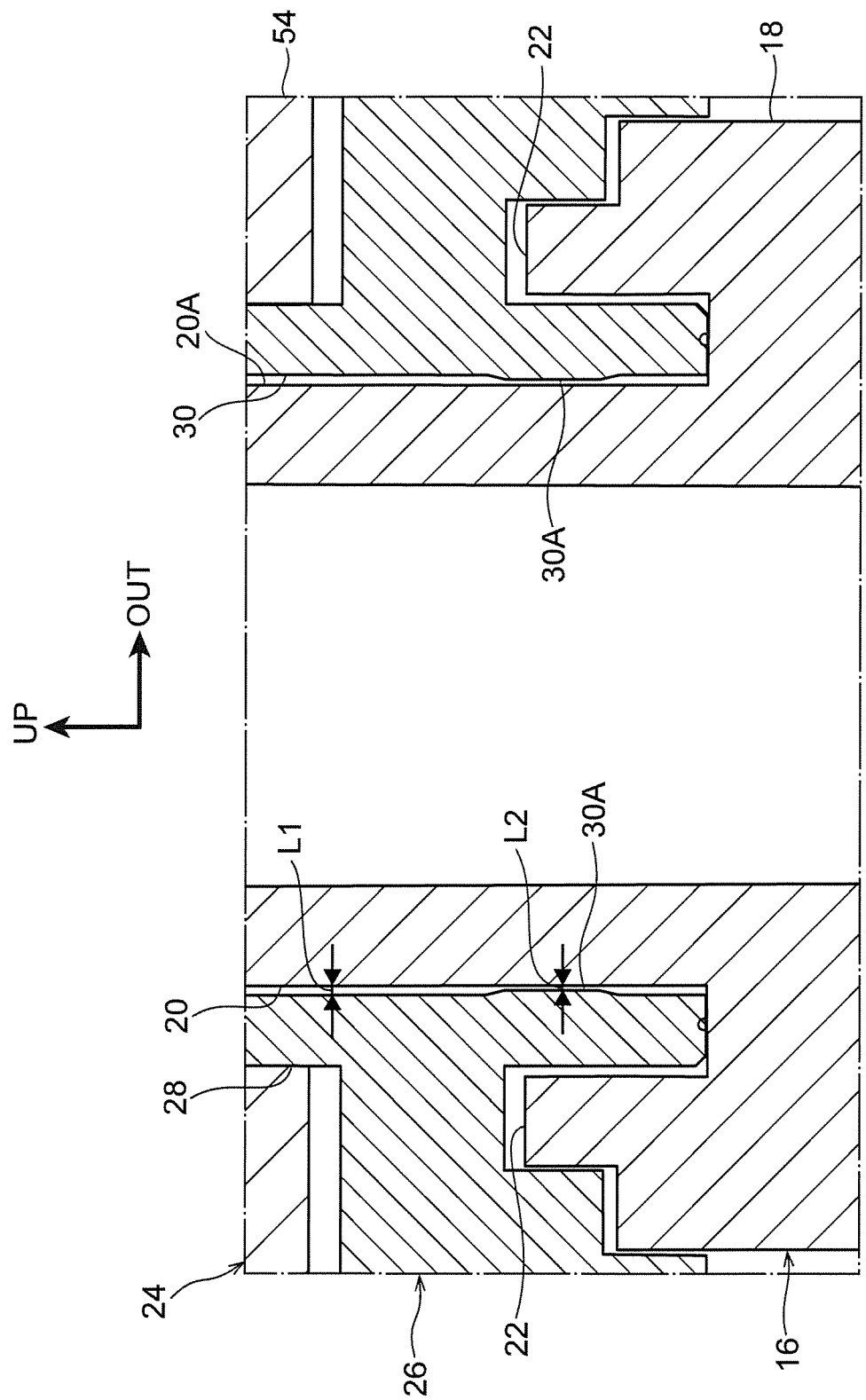
FIG. 6 is a cross-section illustrating main portions of a storing mechanism of a vehicle door mirror device according to an exemplary embodiment, as viewed from the vehicle rear.
Figure 7:
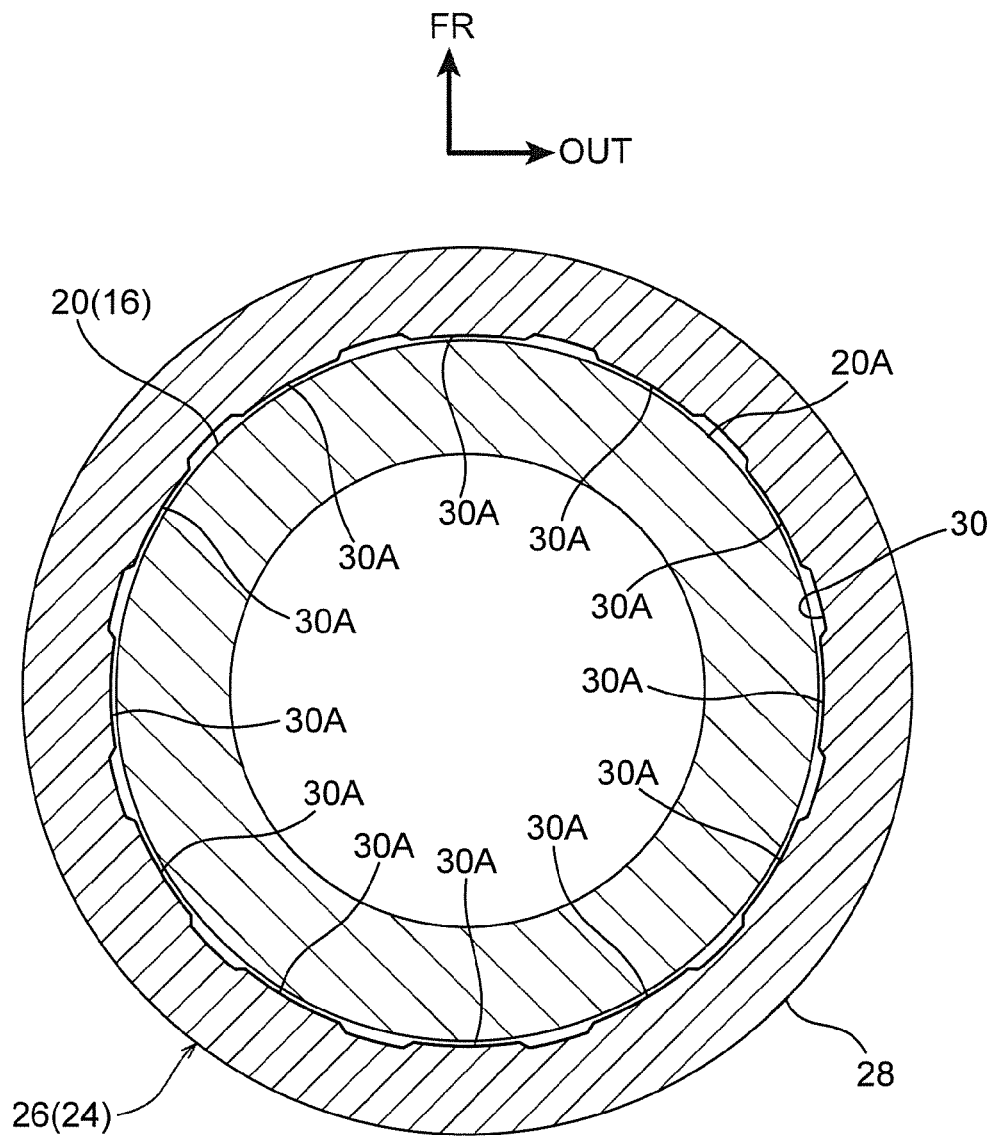
FIG. 7 is a cross-section illustrating main portions of a storing mechanism of a vehicle door mirror device according to an exemplary embodiment, as viewed from above.

As illustrated in detail in FIG. 5 to FIG. 7, a vehicle width direction inside portion of a lower wall (bottom wall) of the case 26 is integrally formed with a circular cylinder shaped through cylinder 28. The through cylinder 28 penetrates the lower wall of the case 26. A through hole 30 with a substantially circular cross-section profile is coaxially formed inside the through cylinder 28, and the lower support cylinder 20A of the support shaft 20 penetrates the through hole 30 (inside the through cylinder 28), so as to rotatably support the case 26 on the lower support cylinder 20A. A lower face of the through cylinder 28 rests on the fixing portion 18 of the stand 16, thereby stopping movement of the case 26 toward the lower side.

Plural (12 in the present exemplary embodiment) lower ribs 30A, serving as protrusion portion, are formed at a lower side portion of a peripheral face of the through hole 30 (an inner peripheral face of the through cylinder 28). The plural lower ribs 30A respectively protrude out toward the radial direction inside of the through hole 30, and are disposed at uniform intervals around the peripheral direction of the through hole 30. The lower ribs 30A are substantially configured in a truncated rectangular pyramid shape, and in cross-section taken along the peripheral direction of the through hole 30, the area of each of the lower ribs 30A becomes smaller on progression toward the protruding direction (toward the radial direction inside of the through hole 30). Protrusion leading end faces (contact portions) of the respective lower ribs 30A curve along (following) the peripheral direction of the through hole 30, and the protrusion leading end faces of the lower ribs 30A are capable of making contact (specifically, making face-to-face contact) with an outer peripheral face of the lower support cylinder 20A of the support shaft 20. A dimension of the protrusion leading end face of each lower rib 30A in the axial direction of the through hole 30 is, for example, 2 mm, and a dimension of the protrusion leading end face of each lower rib 30A in the peripheral direction of the through hole 30 is, for example, 2 mm.

In a case in which the through hole 30 is disposed coaxially to the lower support cylinder 20A, a gap dimension L1 between the peripheral face of the through hole 30 and the outer peripheral face of the lower support cylinder 20A (a gap dimension in the radial direction of the through hole 30 and the lower support cylinder 20A, see FIG. 6) is, for example, 0.26 mm, and a gap dimension L2 between the protrusion leading end face of the lower rib 30A and the outer peripheral face of the lower support cylinder 20A (a gap dimension in the radial direction of the through hole 30 and the lower support cylinder 20A, see FIG. 6) is, for example, 0.06 mm or below (specifically, 0.025 mm).

A lower face (bottom face) of the case 26 is integrally provided with a specific number (two in the present exemplary embodiment) of substantially rectangular column shaped rotation projections 32, serving as rotation portion configuring the moderation section, at the peripheral outside of the through cylinder 28. The specific number of rotation projections 32 respectively curve in the length direction along the peripheral direction of the through cylinder 28, and are disposed at uniform intervals around the peripheral direction of the through cylinder 28. Both length direction end faces of each rotation projection 32 are inclined in directions heading toward the upper side on progression toward the length direction outside of the respective rotation projection 32.

The position of the rotation projection 32 coincides with the position of the restriction projection 22 of the stand 16 in the axial direction and in the radial direction of the support shaft 20. The positional coinciding (overlapping) amount, in the radial direction of the support shaft 20, between the rotation projection 32 and the restriction projection 22 is greatest in a case in which the through hole 30 is disposed coaxially to the lower support cylinder 20A of the support shaft 20. Length direction end faces on the standing out direction side of the rotation projections 32 abut length direction end faces on the storing direction side of the restriction projections 22, thereby restricting the case 26, and therefore the drive body 24, from rotating toward the standing out direction, such that the drive body 24 is disposed at a standing out position. The position of at least a part of the abutting portion (area) between the length direction end face of the rotation projection 32 and the length direction end face of the restriction projection 22 (the entire abutting portion in the present exemplary embodiment) coincides with the position of the protrusion leading end face of the lower rib 30A in the axial direction of the support shaft 20.

As illustrated in FIG. 3, a resin motor base 34, serving as an additional rotation member, is fixed inside an upper portion of the case 26. The motor base 34 is integrated to the case 26.

At a vehicle width direction inside portion of the motor base 34, a substantially circular cylinder shaped housing cylinder 36 is provided. The housing cylinder 36 is disposed coaxially to the through cylinder 28 of the case 26. The inside of the housing cylinder 36 is open at both at an upper side and a lower side, and the support shaft 20 is housed within the housing cylinder 36.

A substantially circular cylinder shaped contact cylinder 36A is provided coaxially to an upper side portion of the housing cylinder 36. The contact cylinder 36A has a smaller diameter than a lower side portion of the housing cylinder 36. A circular cylinder shaped insertion cylinder 36B is coaxially provided in the vicinity of the inside of the contact cylinder 36A, and an upper end of the insertion cylinder 36B is integral to the contact cylinder 36A. A contact hole 38 with a substantially circular ring shaped cross-section is formed between the contact cylinder 36A and the insertion cylinder 36B, and the contact hole 38 is open toward the lower side. The insertion cylinder 36B is inserted inside the upper support cylinder 20B of the support shaft 20 of the stand 16, and the upper support cylinder 20B is inserted into the contact hole 38, so as to rotatably support the motor base 34 on the upper support cylinder 20B.

Plural (eight in the present exemplary embodiment) substantially rectangular column shaped upper ribs 38A, serving as additional protrusion portion, are formed at the outer peripheral face of the contact hole 38 (an inner peripheral face of the contact cylinder 36A). The plural upper ribs 38A are each disposed with their length direction along the axial direction of the contact hole 38, and are disposed at uniform intervals around the peripheral direction of the contact hole 38. The upper ribs 38A protrude toward the radial direction inside of the contact hole 38, and protrusion leading end faces of the upper ribs 38A are capable of contacting an outer peripheral face of the upper support cylinder 20B.

In a case in which the contact hole 38 is disposed coaxially to the upper support cylinder 20B, a gap dimension between the protrusion leading end face of the upper rib 38A and the outer peripheral face of the upper support cylinder 20B (the minimum gap dimension in the radial direction of the contact hole 38 and the upper support cylinder 20B) is, for example, 0.2 mm, and a gap dimension between the inner peripheral face of the contact hole 38 (the outer peripheral face of the insertion cylinder 36B) and the inner peripheral face of the upper support cylinder 20B (a gap dimension in the radial direction of the contact hole 38 and the upper support cylinder 20B) is, for example, 0.2 mm.

At a vehicle width direction outside portion of the motor base 34, a substantially semi-elliptical plate shaped bottom plate 40 is provided. The bottom plate 40 is integral to a lower end of the housing cylinder 36. A substantially rectangular tube shaped assembly tube 42 is integrally provided at an upper side of the bottom plate 40, and the axial direction of the assembly tube 42 is parallel to the up-down direction.

A container shaped resin cover 44, serving as a cover member, is provided at an upper side of the case 26 and the motor base 34. The cover 44 is open at a lower face. A lower end of the cover 44 is fitted to the outer periphery of an upper end of the case 26. The cover 44 covers the upper side of the case 26 and the motor base 34, and is integral to the case 26.

A motor 46, serving as a drive section, is assembled to a vehicle width direction outside portion of the motor base 34. A main body 46A of the motor 46 is fixed inside the assembly tube 42 of the motor base 34, and an output shaft 46B of the motor 46 penetrates the bottom plate 40 of the motor base 34 and extends out to the lower side of the motor base 34. The motor 46 is electrically connected to a vehicle controller (not shown in the drawings), and the motor 46 is driven under control of the controller, thereby rotating the output shaft 46B of the motor 46.

As illustrated in FIG. 3 and FIG. 4, a rotation mechanism 48 (gear mechanism) is provided inside the case 26.

The rotation mechanism 48 is provided with a worm gear 50, serving as a gear member (first stage gear) at the lower side of the motor 46, and the worm gear 50 is coaxially attached to the output shaft 46B of the motor 46. The worm gear 50 is capable of rotating integrally with the output shaft 46B, and the worm gear 50 is rotated by rotating the output shaft 46B.

The rotation mechanism 48 is provided with a worm shaft 52, serving as a communication (connecting) gear (intermediate gear) at the vehicle width direction inside of the worm gear 50. The worm shaft 52 is supported by the case 26 so as to be capable of rotating freely. One end side portion (a vehicle rear side portion) of the worm shaft 52 is provided with a helical gear portion 52A (worm wheel gear), and another end side portion (vehicle front side portion) of the worm shaft 52 is provided with a worm gear portion 52B.

The helical gear portion 52A enmeshes with the worm gear 50, and the worm shaft 52 (the helical gear portion 52A and the worm gear portion 52B) are rotated by rotating the worm gear 50.

The support shaft 20 of the stand 16 is provided with a gear plate 54 (worm wheel), serving as a fixed gear (final gear). The gear plate 54 is coaxially penetrated by the support shaft 20, and is supported in a rotation restricted state at the lower support cylinder 20A of the support shaft 20. The worm gear portion 52B of the worm shaft 52 enmeshes with the gear plate 54, and the worm gear portion 52B rotates about the gear plate 54 by the worm gear portion 52B being rotated. The drive body 24 accordingly rotates about the support shaft 20 as a center, integrally with the worm gear portion 52B.

As illustrated in FIG. 1, the drive body 24 is housed inside a vehicle width direction inside portion of a visor 56 that has a substantially rectangular parallelopiped shaped container profile, serving as a housing member configuring the rotation body. The visor 56 is open at a vehicle rear side face. A substantially rectangular plate shaped mirror 58, serving as a visual recognition section configuring the rotation body, is disposed inside the visor 56, in the vicinity of the vehicle rear side face (open portion). The visor 56 covers the entire periphery and a vehicle front side face of the mirror 58. A mirror face 58A of the mirror 58 is directed toward the vehicle rear side, and the mirror 58 assists a vehicle occupant (specifically the driver) with visual recognition of the vehicle rear side.

The visor 56 and the mirror 58 are coupled and they are supported by the case 26 of the drive body 24, and the visor 56 and the mirror 58 are capable of rotating about the support shaft 20 integrally with the drive body 24.

When the motor 46 is driven and the output shaft 46B rotates in one direction, the drive body 24 is swung (rotated) toward the storing direction, and the visor 56 and the mirror 58 are swung toward the vehicle rear side and the vehicle width direction inside integrally with the drive body 24. Further, the length direction end face on the storing direction side of the rotation projection 32 of the case 26 abuts the length direction end face on the standing out direction side of the restriction projection 22 of the stand 16, thereby restricting rotating of the drive body 24 toward the storing direction. Accordingly, the visor 56 and the mirror 58 cease to project out with respect to the side door and are stored by the drive body 24 being swung to a stored position.

When the motor 46 is driven and the output shaft 46B rotates in another direction, the drive body 24 is swung toward the standing out direction, and the visor 56 and the mirror 58 are swung toward the vehicle front side and the vehicle width direction outside integrally with the drive body 24. Further, the length direction end face on the standing out direction side of the rotation projection 32 of the case 26 abuts the length direction end face on the storing direction side of the restriction projection 22 of the stand 16, thereby restricting rotating of the drive body 24 toward the standing out direction. Accordingly, the visor 56 and the mirror 58 are made to project out with respect to the side door so as to stand out (deploy, return), by the drive body 24 being swung to a standing out position (in-use position, return position).

Next, explanation follows regarding operation of the present exemplary embodiment.

In the vehicle door mirror device 10 configured as described above, in the storing mechanism 14, the lower support cylinder 20A of the support shaft 20 of the stand 16 penetrates the through hole 30 of the case 26 (through cylinder 28) of the drive body 24, and the upper support cylinder 20B of the support shaft 20 is inserted into the contact hole 38 of the motor base 34 (housing cylinder 36) of the drive body 24, such that the drive body 24 is rotarably supported by the support shaft 20 (the lower support cylinder 20A and the upper support cylinder 20B).

In the storing mechanism 14, the output shaft 46B is rotated by driving the motor 46 under control of the controller. Accordingly, in the rotation mechanism 48, the worm gear 50 is rotated integrally with the output shaft 46B to rotate the worm shaft 52 (the helical gear portion 52A and the worm gear portion 52B). The worm gear portion 52B is thereby rotated about the gear plate 54 and the drive body 24 is rotated about the support shaft 20 as the center, integrally with the worm gear portion 52B. The drive body 24 is accordingly swung (rotated) toward the storing direction or the standing out direction, such that the visor 56 and the mirror 58 are swung integrally with the drive body 24 so as to be stored or to stand out.

When rotating the drive body 24 in the storing direction, the length direction end face on the storing direction side of the rotation projection 32 of the case 26 abuts the length direction end face on the standing out direction side of the restriction projection 22 of the stand 16, restricting the drive body 24 from rotating toward the storing direction.

On the other hand, when rotating the drive body 24 in the standing out direction, the length direction end face on the standing out direction side of the rotation projection 32 of the case 26 abuts the length direction end face on the storing direction side of the restriction projection 22 of the stand 16, restricting the drive body 24 from rotating toward the standing out direction.

Note that the upper ribs 38A are formed in a protruding state at the outer peripheral face of the contact hole 38 of the motor base 34 (housing cylinder 36), and the protrusion leading end faces of the upper ribs 38A are capable of contacting the outer peripheral face of the upper support cylinder 20B of the support shaft 20. The gap dimension between the outer peripheral face of the contact hole 38 of the motor base 34 and the outer peripheral face of the upper support cylinder 20B is therefore small, suppressing rattling and tilting of the drive body 24 with respect to the support shaft 20.

Note that the lower ribs 30A are formed in a protruding state at the peripheral face of the through hole 30 of the case 26 (through cylinder 28), and the protrusion leading end faces of the lower ribs 30A are capable of contacting the outer peripheral face of the lower support cylinder 20A of the support shaft 20.

The gap dimension between the peripheral face of the through hole 30 of the case 26 and the outer peripheral face of the lower support cylinder 20A can accordingly be made smaller, enabling rattling and tilting of the drive body 24 with respect to the support shaft 20 to be effectively suppressed. This thereby enables the support rigidity of the drive body 24, the visor 56, and the mirror 58 by the support shaft 20 to be effectively increased, enabling chattering of the mirror 58 during vehicle travel and the like to be effectively suppressed.

Moreover, in the present exemplary embodiment, the (total) contact surface area between the peripheral face of the through hole 30 of the case 26 and the outer peripheral face of the lower support cylinder 20A can be made smaller than in a case in which the entire peripheral face of the through hole 30 contacts the outer peripheral face of the lower support cylinder 20A, thereby enabling an increase in sliding resistance (sliding torque) between the peripheral face of the through hole 30 and the outer peripheral face of the lower support cylinder 20A to be suppressed when rotating the drive body 24. This thereby enables an increase in the driving force of the motor 46 required to rotate the drive body 24, the visor 56, and the mirror 58 to be suppressed, and also enables the occurrence of sliding noise between the peripheral face of the through hole 30 and the outer peripheral face of the lower support cylinder 20A to be suppressed.

Regarding position in the support shaft 20 axial direction, the protrusion leading end faces of the lower ribs 30A (the contact portions with the outer peripheral face of the lower support cylinder 20A) coincide with at least a part of the respective abutting portions between the length direction end faces of the rotation projections 32 of the case 26 and the length direction end faces of the restriction projections 22 of the stand 16.

Accordingly, the through hole 30 can be disposed to a position closer to the coaxial position to the lower support cylinder 20A than in a case in which the lower ribs 30A are formed at an upper side portion of the peripheral face of the through hole 30. Accordingly, when the length direction end faces of the rotation projections 32 and the length direction end faces of the restriction projections 22 abut each other when the drive body 24 is rotated in the storing direction or the standing out direction, the abutting amount between the length direction end faces of the rotation projections 32 and the length direction end faces of the restriction projections 22 can be increased, enabling the length direction end faces of the rotation projections 32 and the length direction end faces of the restriction projections 22 to abut each other in an appropriate manner, and enabling rotating of the drive body 24 toward the storing direction or the standing out direction to be appropriately restricted.

Moreover, the distance in the up-down direction (in the axial direction of the support shaft 20) between the upper ribs 38A of the motor base 34 and the lower ribs 30A can be made larger than in a case in which the lower ribs 30A are formed at an upper side portion of the peripheral face of the through hole 30, thereby enabling tilting of the drive body 24 with respect to the support shaft 20 to be even more effectively suppressed. The support rigidity of the drive body 24, the visor 56 and the mirror 58 by the support shaft 20 can accordingly be even more effectively increased, enabling chattering of the mirror 58 during vehicle travel or the like to be even more effectively suppressed.

Tilting of the drive body 24 with respect to the support shaft 20 can be effectively suppressed, as described above, even without increasing the axial direction dimension of the through hole 30 (through cylinder 28) of the case 26. Accordingly, an increase in size of the drive body 24 in the axial direction of the through hole 30 can be suppressed, enabling an increase in size of the storing mechanism 14, and therefore of the vehicle door mirror device 10, in the axial direction of the through hole 30 to be suppressed.

Note that in the present exemplary embodiment, portions where the peripheral face of the through hole 30 of the case 26 contacts the outer peripheral face of the lower support cylinder 20A (the protrusion leading end faces of the lower ribs 30A) are provided around a part of the peripheral direction of the through hole 30. However, a portion where the peripheral face of the through hole 30 of the case 26 contacts the outer peripheral face of the lower support cylinder 20A may be provided at the entire portion in the peripheral direction of the through hole 30.

In the present exemplary embodiment, the motor base 34 (upper ribs 38A) can contact the outer peripheral face of the upper support cylinder 20B of the stand 16. However, configuration may be made in which the cover 44 is capable of contacting the outer peripheral face of the upper support cylinder 20B of the stand 16.

In the present exemplary embodiment, the vehicle visual recognition device is applied to the vehicle door mirror device 10. However, the vehicle visual recognition device may be applied to other vehicle outer mirror devices at the exterior of a vehicle (for example, a vehicle fender mirror device), or to vehicle inner mirror devices in the interior of a vehicle.

In the present exemplary embodiment, the visual recognition section is configured by the mirror 58. However, the visual recognition section may be configured by a camera that uses image capture to assist an occupant with visual recognition.

What is claimed is:

1. A vehicle visual recognition device comprising:
   a support shaft that is supported at a vehicle body side, the support shaft including a distal end portion thereof which is at a distal end side in the axial direction of the support shaft, and including a base end portion thereof which is at a base end side in the axial direction of the support shaft and which is at the vehicle body side;
   a rotation member that is provided with a through hole, and that is rotatably supported at the support shaft with the support shaft penetrating through the through hole;
   a protrusion portion that is protrudingly provided at a peripheral face of the through hole, and that is capable of contacting the support shaft; and
   a visual recognition section that is provided so as to be capable of rotating integrally with the rotation member, that assists a vehicle occupant with visual recognition, and that is stored or stands out by rotating of the rotation member,
   wherein in a state in which the through hole is positioned coaxially to the base end portion of the support shaft, a gap (L2) is provided between a protrusion leading end of the protrusion portion and a peripheral face of the base end portion of the support shaft and the protrusion portion does not contact any part of the peripheral face of the support shaft,
   further comprising a plurality of protrusion portions, wherein protruding dimensions of the protruding leading end of each protrusion portion toward an axis of the support shaft are the same.

2. The vehicle visual recognition device of claim 1, further comprising:
   a restriction portion that is provided at the vehicle body side, a position of the restriction portion coinciding with a position of the protrusion portion in an axial direction of the support shaft; and
   a rotation portion that is provided at the rotation member, a position of the rotation portion coinciding with the position of the protrusion portion in the axial direction of the support shaft, and rotating of the rotation member being restricted by the rotation portion abutting the restriction portion.

3. The vehicle visual recognition device of claim 2, wherein a position of a leading end face of the protrusion portion, that is capable of contacting the support shaft, coincides with a position of at least a part of an abutting area where the restriction portion abuts the rotation portion, in the axial direction of the support shaft.

4. The vehicle visual recognition device of claim 2, wherein:

a plurality of protrusion portions, protruding toward a side of the support shaft, are provided at the peripheral face of the through hole along a peripheral direction of the support shaft, and respective leading end faces of the protrusion portions are capable of contacting the support shaft; and the restriction portion and the rotation portion are provided at positions further toward an outer side than positions of the plurality of protrusion portions in a radial direction of the support shaft, and rotating of the rotation member is restricted by an end portion in the peripheral direction of the restriction portion abutting an end portion in the peripheral direction of the rotation portion.

5. The vehicle visual recognition device of claim 1, further comprising:

a restriction portion that is provided at the vehicle body side; and a rotation portion that is provided at the rotation member, rotating of the rotation member being restricted by the rotation portion abutting the restriction portion, wherein a position of a leading end face of the protrusion portion, that is capable of contacting the support shaft, coincides with a position of at least a part of an abutting area where the restriction portion abuts the rotation portion, in an axial direction of the support shaft.

6. The vehicle visual recognition device of claim 1, wherein a plurality of protrusion portions, protruding toward a side of the support shaft, are provided at the peripheral face of the through hole along a peripheral direction of the support shaft, and respective leading end faces of the protrusion portions are capable of contacting the support shaft.

7. A vehicle visual recognition device comprising:

a support shaft that is supported at a vehicle body side, the support shaft including a distal end portion thereof which is at a distal end side in the axial direction of the support shaft, and including a base end portion thereof which is at a base end side in the axial direction of the support shaft and which is at the vehicle body side;

a rotation member that is provided with a through hole having a peripheral face, and that is rotatably supported at the support shaft with the support shaft penetrating through the through hole, wherein a gap (L1) is provided between a surface of the base end portion of the support shaft and the peripheral face of the through hole;

a protrusion portion that is protrudingly provided at a peripheral face of the through hole, and that is capable of contacting the support shaft; and a visual recognition section that is provided so as to be capable of rotating integrally with the rotation member, that assists a vehicle occupant with visual recognition, and that is stored or stands out by rotating of the rotation member, wherein in a state in which the through hole is positioned coaxially to the base end portion of the support shaft, a gap (L2) is provided between a protrusion leading end of the protrusion portion and the peripheral face of the base end portion of the support shaft and the protrusion portion does not contact any part of the peripheral face of the support shaft, further comprising a plurality of protrusion portions, wherein dimensions of the gaps (L2) from the protruding leading end of each protrusion portion toward an axis of the support shaft are the same, and wherein the dimensions of the gaps (L1) and (L2) are different.

* * * * *